United States Patent
Trescott, Jr. et al.

(10) Patent No.: US 7,308,824 B2
(45) Date of Patent: Dec. 18, 2007

(54) THERMAL DISPERSION FLOW METER WITH CHRONOMETRIC MONITOR FOR FLUID LEAK DETECTION

(75) Inventors: Robert C. Trescott, Jr., San Diego, CA (US); Frank W. Collurafici, Escondido, CA (US); Frank P. Collurafici, Escondido, CA (US); Scott Shaw, Brentwood, TN (US)

(73) Assignee: Sentinel Hydrosolutions, LLC, San Marcos, CA (US)

( * ) Notice: Subject to any disclaimer, the term of this patent is extended or adjusted under 35 U.S.C. 154(b) by 49 days.

(21) Appl. No.: 11/356,732

(22) Filed: Feb. 17, 2006

(65) Prior Publication Data

US 2006/0283236 A1  Dec. 21, 2006

Related U.S. Application Data

(60) Provisional application No. 60/654,405, filed on Feb. 17, 2005.

(51) Int. Cl.
  *G01F 1/68* (2006.01)
(52) U.S. Cl. .................................. 73/204.11
(58) Field of Classification Search ............ 73/204.11, 73/49.2, 49.3; 340/605
See application file for complete search history.

(56) References Cited

U.S. PATENT DOCUMENTS

| | | | |
|---|---|---|---|
| 3,535,927 A | 10/1970 | Mahon et al. | |
| 3,874,222 A | 4/1975 | Ladd et al. | |
| 4,036,053 A | 7/1977 | Jenkins | |
| 4,180,088 A | 12/1979 | Mallett | |
| 4,335,605 A | 6/1982 | Boyd | |
| 4,336,708 A | 6/1982 | Hobgood et al. | |
| 4,518,955 A | 5/1985 | Meyer | |
| 4,529,974 A | 7/1985 | Tanaka et al. | |
| 4,589,435 A | 5/1986 | Aldrich | |
| 4,911,200 A | 3/1990 | Ben-Arie | |
| 4,926,901 A | 5/1990 | Waltenburg | |
| 5,000,224 A | 3/1991 | Olson, Jr. et al. | |
| 5,004,014 A | 4/1991 | Bender | |
| 5,056,554 A | 10/1991 | White | |
| 5,090,436 A | 2/1992 | Hoch, Jr. et al. | |
| 5,228,329 A | 7/1993 | Dennison | |
| 5,267,587 A | 12/1993 | Brown | |
| 5,402,110 A * | 3/1995 | Oliver et al. | 340/605 |
| 5,548,278 A * | 8/1996 | Oliver et al. | 340/605 |
| 5,637,789 A | 6/1997 | Lawson | |
| 5,764,539 A | 6/1998 | Rani | |
| 5,771,920 A | 6/1998 | Jewett | |
| 5,794,653 A | 8/1998 | DeSmet | |
| 5,966,076 A | 10/1999 | Cantrell | |
| 6,147,613 A | 11/2000 | Doumit | |

(Continued)

*Primary Examiner*—Jewel Thompson
(74) *Attorney, Agent, or Firm*—Gary L. Eastman

(57) ABSTRACT

A thermal dispersion flow meter with chronometric monitor for fluid leak detection includes an ambient temperature RTD sensor and a flow rate RTD sensor which are configured to sense the temperature of a fluid in a conduit, and then monitor the flow of that fluid through the conduit. The fluid flow RTD sensor is incorporated into a Wheatstone bridge circuit which is used to provide increased sensitivity to the outputs of the RTD sensors. Based upon the ambient temperature sensor readings, the flow rate RTD sensor may be adjusted to optimize the operation of the system to detect leaks, and on certain conditions, a controller may close a supply line valve to avoid flooding of a structure.

30 Claims, 15 Drawing Sheets

U.S. PATENT DOCUMENTS

| | | |
|---|---|---|
| 6,182,501 B1 * | 2/2001 | Furuse et al. ................ 73/49.2 |
| 6,216,727 B1 | 4/2001 | Genova |
| 6,310,555 B1 | 10/2001 | Stern |
| 6,374,846 B1 | 4/2002 | DeSmet |
| 6,481,265 B1 | 11/2002 | Weber |
| 6,696,961 B2 | 2/2004 | Uhler |
| 6,804,990 B2 | 10/2004 | Weber |
| 6,860,288 B2 | 3/2005 | Uhler |
| 6,883,389 B2 | 4/2005 | Eldridge |
| 7,054,767 B2 | 5/2006 | Eldridge |
| 2004/0225458 A1 | 11/2004 | Sherikar |

* cited by examiner

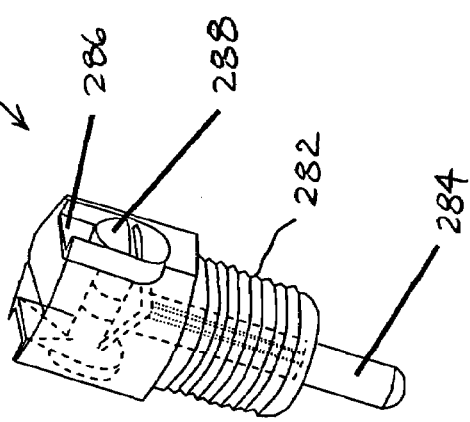
FIGURE 3
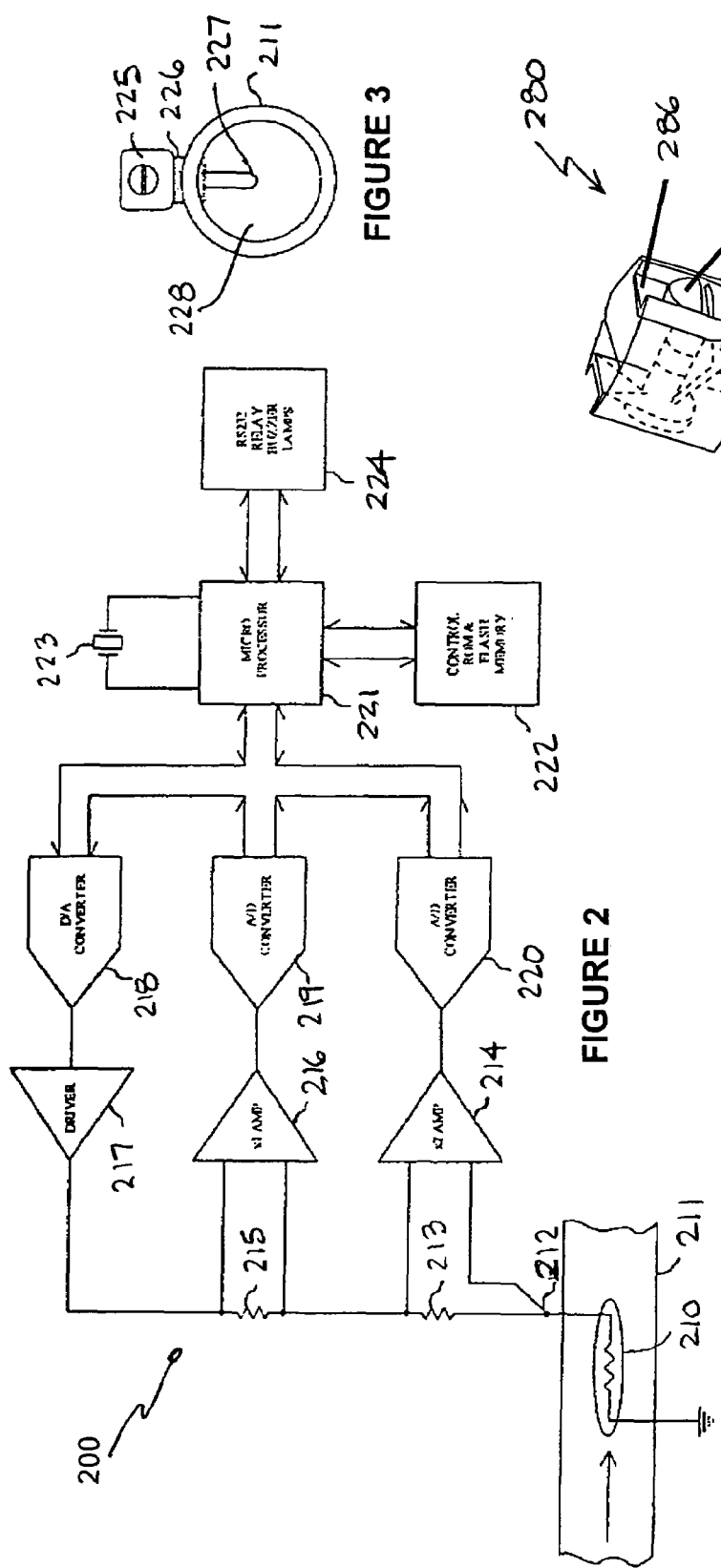
FIGURE 5
FIGURE 2

THERMAL DISPERSION FLOW METER WITH CHRONOMETRIC MONITOR FOR FLUID LEAK DETECTION

RELATED APPLICATIONS

This application claims the benefit of priority to U.S. Provisional Patent Application Ser. No. 60/654,405 entitled "Thermal Dispersion Flow Meter with Chronometric Monitor for Fluid Leak Detection" filed Feb. 17, 2005, and currently co-pending.

FIELD OF THE INVENTION

The present invention relates generally to the field of fluid leakage detection. More particularly, the present invention relates to devices useful for the monitoring and evaluation of fluid flow rates. The present invention is more particularly, though not exclusively, useful as a leak detection system capable of detecting even the smallest fluid leakage within a fluid conduit system, and terminating fluid flow in response to the leak.

BACKGROUND OF THE INVENTION

In the process of residential or commercial building construction, builders will frequently pre-plumb water supply pipes, and then encase the foundation level plumbing within a concrete mixture creating a floor slab. The plumbing will remain in use for the existence of the structure until it fails and leaks. Slab leaks typically start when a pinhole size rupture forms in a pipe or fitting from a period of constant pressure, friction with the slab material, and thermal expansion and contraction. As more water passes through the opening, in time, the size of the rupture increases. Undetected, the escaping water will eventually flood the foundation, damage floors and walls and ultimately undermine the ground beneath the structure due to erosion.

The control of water has challenged man since the beginning. The world today benefits and suffers from the conveyance and containment of this life giving fluid. No matter the culture, the class, or the location, similar issues are considered, such as materials, installation, pressures, maintenance, effects of internal and external conditions, including water quality, climactic conditions, electrolysis, etc. Issues with any one of these may result in undesirable effects and damages.

Leaks can be slow and gradual, taking years to detect until significant property damage occurs, or there can be large leaks that quickly produce a variety of damaging results. Significant costs are expended everyday all over the world from these water-related damages. The costs are so extensive and pervasive, that nearly everyone in our modern world has been personally affected.

Leaks occur at all phases of water system function, both during and after construction. During construction leaks result from improper installation, faulty materials, testing, unintentional trade damage, and vandalism—to name a few. Once a water system is installed, leaks are often a daily occurrence. Costs are spread between responsible parties, insurance companies and often to those not responsible who cannot prove otherwise, or because responsible parties have no ability to pay the frequently large damages. Virtually anyone in the construction industry can tell you horror stories about water damage during their most recent project. Most in the industry accept these damages simply as part of the construction world and never consider there may actually be a solution to eliminate or minimize these damages.

Once a building, home or facility becomes occupied, the risks of leaks may shift, but still remain as a liability, as any insurance underwriter can attest. The repair and refurbishment resulting from leaks is an enormous industry, most recently exacerbated by the scares and realities of mold. Slow, hard to detect leaks within walls, ceilings or concealed areas often result in the most damage, as they introduce moisture into a warm, stable atmosphere of a controlled environment, resulting in mold growth that can cause extensive damage and may include condemnation of the home or building.

Large leaks or ruptures can be catastrophic within a very short amount of time, sometimes within minutes. In commercial structures, leaks can damage computer systems resulting in untold losses of computer data. These risks are not simply limited to property damage, but include personal injury and even death. Toxic mold has verifiably taken a number of lives. Leaks also substantially increase the risk of electrical shock, not to mention medically sensitive risks caused by leaks. Leaks are indiscriminate of time, occurring when occupants are present or away.

Until recently the prevention of leaks and/or mitigation of leak damages have been very limited. The "Loss Prevention" programs of insurance companies have focused primarily on minimizing the underwriting of clients with a history of previous leak claims rather than providing any true measure of "Loss Prevention".

It is known that existing water maters are capable of detecting and reporting water consumption, but systems, which employ paddle wheels, turbines or other such impellers suffer from mechanical limitations which allows small flows to slip past the meter undetected.

SUMMARY OF THE INVENTION

In a preferred embodiment of the present invention, the LDD is a water flow monitor and alarm system for detecting water leaking from the pressurized pipes or fixtures in residential and commercial building structures. The sensor probes have no moving parts to wear out and can detect water flow as little as a few ounces of water per hour. If water flows continuously for a preset time without stopping, it triggers an alarm. The alarm function can be set to alert the homeowner or a surveillance company monitoring the premises. Integrated into the system are user guides and features to aid the homeowner or a professional in detecting a leak.

Such an alarm condition could indicate a faulty valve or a more serious condition known as a "slab leak". An undetected slab leak (a broken pipe in or under a concrete slab floor) can cause extreme structural damage in excess of thousands of dollars, and render the property uninsurable from the resulting insurance claim.

The sensor probes are mounted directly into the main water supply and detect all flow conditions. Not just water loss under the hot water heater or dishwasher or an icemaker like other point of leak detection competitive devices, but water loss for the entire structure. A comprehensive system may include moisture sensors together with the LDD. This will ensure both immediate and long-term protection of the structure and its contents and detect leaks from the pressurized supply side as well as the drain and waste systems, appliances, and water intrusion from the environment. Resource conservation and water cost savings are also promoted by detecting unknown water loss long before thousands of gallons escape down the drain or into the structure's foundation.

The control panel is easy to use and attractive. Its display provides real-time system and flow status. The Panel will indicate an alarm condition; the flow level when the alarm occurred, and sound a built-in beeper, then if no action is taken it will activate an industrial quality motor-driven ball valve and shut off the water to the structure. The control panel will then display information to guide the homeowner through the process of detecting simple leaks such as a dripping faucet. The panel can also be used to select other operating modes or select other features of the LDD.

When the LDD is connected to an auto-dialer telephone device, it can alert anyone with a telephone that a problem exists. When connected to an electric water valve, which is the design for the initial product, it can shut-off the water automatically until the system is manually reset. Other devices may be connected to the LDD to coordinate moisture and over-pressure sensors and leak detection throughout the entire structure.

ALTERNATIVE EMBODIMENTS

A dual RTD sensor device is contemplated herein which includes an ambient RTD temperature sensor and a flow RTD sensor. The combination of the two sensors provides for more instantaneous response to the flow of water.

Device Capabilities

It is to be apparent to one skilled in the art that the present invention is, without departing from the spirit of the invention, capable of the following:

Proprietary technology to measure flow using no moving parts also allows the ability to sense much lower flow than traditional impellers.

Product includes both a "Home" and an "Away" mode. Each mode will include different settings that are adjustable by the installer.

Home mode will include a longer period of flow time before a leak is registered. Notification will include an audible alarm.

Away mode will include a much shorter period of flow time before a leak is registered to avoid a long period of time of unnoticed water flow.

The proprietary LCD touch screen panel will display simple instructions for the homeowner to follow if a leak is detected.

Panel will be wall mounted, and panel power and display data will be sent via wire to the panel; a horizontal bar graph display will show real time flow; an adjustable arrow on the bar graph will indicate the alarm point settings. This will allow the user to program around known leaks, if necessary.

The device will include the ability to reset for one alarm cycle in the home mode. The unit will sound an alarm and partially shut the valve off 5 minutes before the alarm cycle time is up. This will allow someone else at home to prevent an alarm in the unusual instance that water has been flowing for legitimate reasons.

The device will include the ability to shut off the water from the panel.

The device will include the ability to set a delay before going into "Away" mode so a load of wash or dishes can finish before the unit switches from "Home" to "Away" mode.

The device has the ability to be programmed to automatically enter the away mode like a programmable thermostat can automatically turn down the heat.

The device is easily networked with remote point of leak detectors.

The device has the ability to connect to an alarm system and the ability to signal small or large leaks on separate alarm channels.

Multiple leak detection devices can be networked to one control panel, for large projects that require it.

The current target low flow value is 1 fluid ounce per hour. The high flow rate will be defined by overall system capabilities.

The device allows connection to an optional sensor to determine when a reverse osmosis filter or a water softener is recycling in the "Away" mode to prevent shutting the water off due to these automatic devices flowing water.

The device includes a battery back-up option. This will provide short-term power to the system and also alert the alarm panel that A/C power has been interrupted.

The device is designed using a low voltage (12-24 volt, 1 amp) power supply.

The device includes a water flow sensing system integrated with the valve.

BRIEF DESCRIPTION OF THE FIGURES

The novel features of this invention, as well as the invention itself, both as to its structure and its operation, will be best understood from the accompanying drawings, taken in conjunction with the accompanying description, in which reference characters refer to similar parts, and in which:

FIG. 2 is an electrical schematic showing the placement of the resistance temperature detector (RTD) flow sensor in a water pipe (conduit), and amplifiers configured to form a Wheatstone bridge circuit to detect the variations in the resistance of the flow sensor produced by the flow of fluid through the conduit;

FIG. 3 is a cross-sectional view of the sensor as installed into a water pipeline, with the sensor probe extending away from the conduit wall and into the moving fluid;

FIG. 5 is a perspective view of the structure of the RTD flow sensor element, showing the threaded portion, and the sensor probe extending therefrom;

DETAILED DESCRIPTION OF A PREFERRED EMBODIMENT

Figure 1:
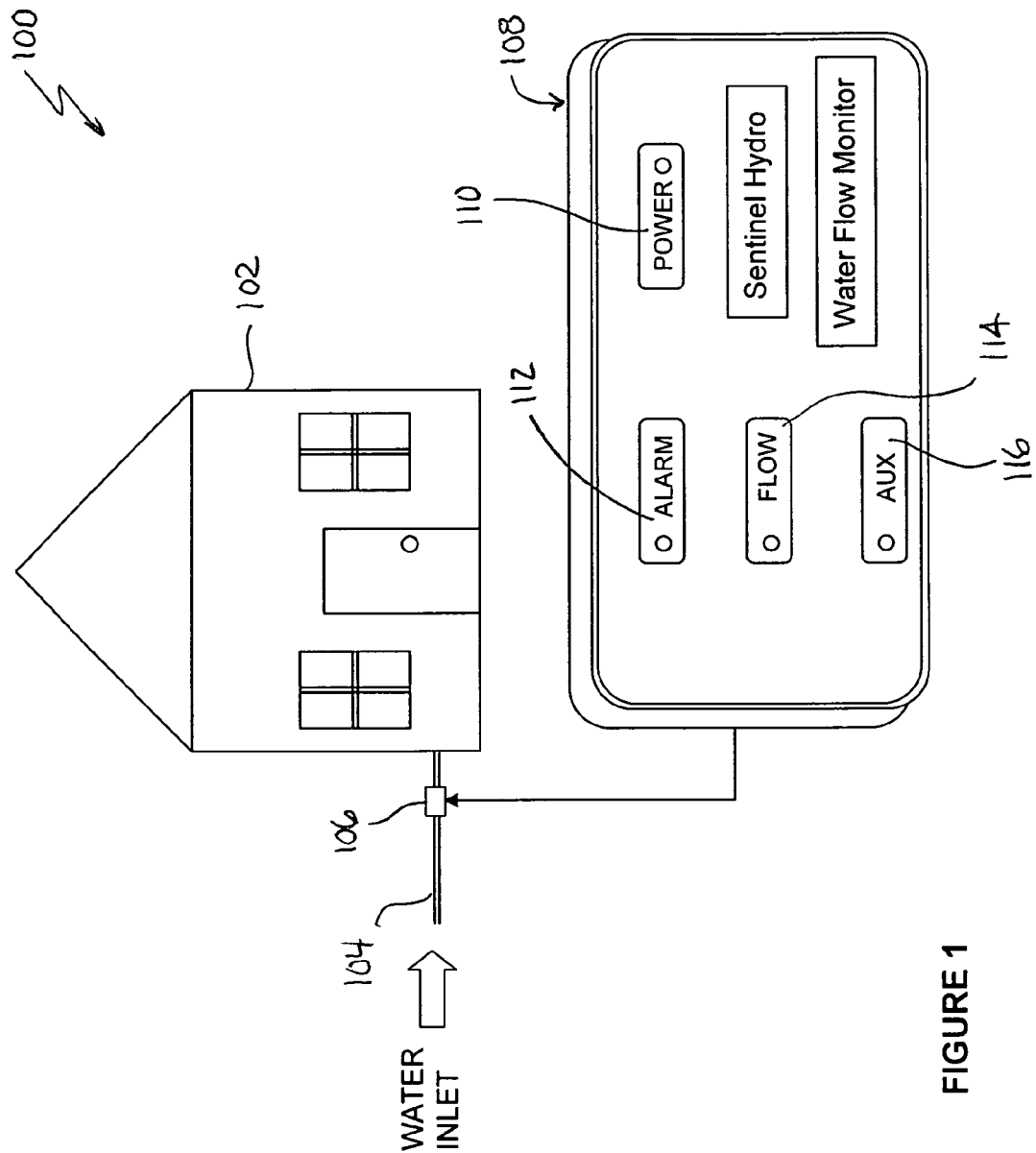
FIG. 1 is an exemplary view of the controller of the present invention as integrated with a structure, and showing the status panel of the system including an alarm indicator, an auxiliary indicator, a flow indicator, and a power indicator.

Referring initially to FIG. 1, the system of the present invention is generally designated 100, and shown with a structure 102 having a water inlet pipe 104 equipped with the sensor and controller 106, and showing the status panel 108 of the system including a power indicator 110, an alarm indicator 112, a flow indicator 114, and an auxiliary indicator 116.

In this preferred embodiment shown in FIG. 1, the flow monitor is configured as a water flow meter and alarm system for detecting leaking water pipes or fixtures in residential and commercial building structures 102. The sensor probe is a resistance temperature detector (RTD) which has no moving parts to wear out and can detect water flow as little as a few ounces of water per hour. If water flows continuously for a preset time without stopping, it triggers an alarm. The alarm function can be set to alert the homeowner or a surveillance company monitoring the premises.

Such an alarm condition could indicate a faulty valve or a more serious condition knows as a "slab leak." An undetected slab leak can cause flood damage to a structure in excess of thousands of dollars, and render the property uninsurable, from the resulting insurance claim.

The control panel, as shown in FIG. 1, is easy to use and attractive. This display provides real-time status and operation of the system. A power indicator shows the system is active while a flow lamp reveals the instantaneous use of any water flow. The alarm lamp will indicate an alarm condition, sound a built-in beeper, and latch on a relay until manually disarmed by pressing a touch switch in the center of the control panel. This touch switch can be used to select other operation modes or select other features of the water flow monitor.

When the water flow monitor is connected to an auto-dialer telephone device, it can alert anyone with a telephone that a problem exists. When connected to an electric water valve, it can shut off the water automatically until the system is manually rest. Other devices may be connected to the water flow monitor to coordinate moisture and over-pressure sensors and leak detection throughout the entire structure.

Referring to FIG. 2, an electrical schematic is generally designated 200, and shows the placement of the resistance temperature detector (RTD) flow sensor 210 in a water pipe (conduit) 211. The voltage from the sensor 210 is sensed by operational amplifier 214 from connection 212 across resistor 213, and then sampled by analog to digital converter 220. The output of ADC 220 is fed into a microprocessor 221. The RTD sensor 210 and amplifiers 217, 216, and 214 are configured to form a Wheatstone bridge circuit to detect the variations in the resistance of the flow sensor 210 produced by the flow of fluid through the conduit 211. Using King's law, the flow of the fluid can be determined by the heat that is removed from the RTD sensor element.

The microprocessor 221 is equipped with a crystal 223 for setting the operational frequency of the device, and a memory device 222, such as a RAM or ROM device for storing calibration data and operational control instructions. An output module 224 may be provided to provide output channels for alarm indicator lamps and buzzers, centralized alarm interfaces, and other interfaces receiving an alarm condition indicator.

Referring now to FIG. 3, a cross-sectional view of the RTD sensor probe 227 is shown mounted directly into the main water supply and positioned within the tube exposed to flow 228 thereby detecting all fluid flow conditions. Electrical connections 225 are provided and sensor 227 is, in a preferred embodiment, threaded with threads 226 into the wall of the conduit 211. In this configuration, the present invention detects water flow at its source—the supply line, not just water loss under the water heater or dishwasher or an icemaker like other competitive devices, but water loss for the entire structure.

Combining the present invention with other water sensing components, a comprehensive system may include moisture sensors together with the water flow monitor. This will ensure both immediate and long term protection of the structure and its contents. Resource conservation is also promoted by detecting unknown water loss long before thousands of gallons escape down the drain or into the structure's foundation.

Figure 4:
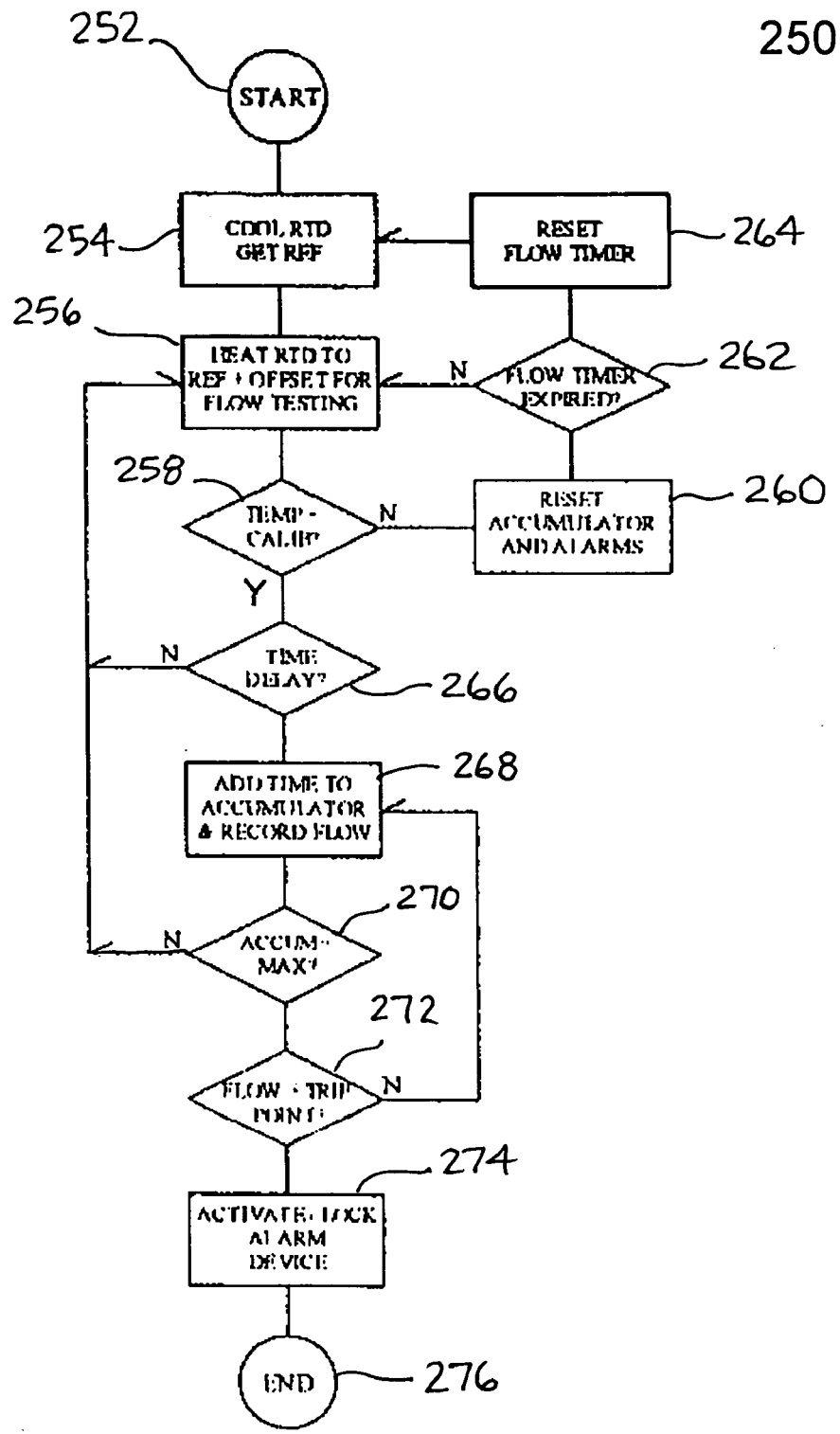
FIG. 4 is an exemplary operational flowchart showing the overall operation of the system of the present invention.

Referring now to FIG. 4, an exemplary operational flowchart showing the overall operation of the system of the present invention is shown and generally designated 250. Flow chart 250 begins with step 252, and proceeds to step 254 wherein the RTD is cooled to establish a reference condition. Once the reference conditions are established, the RTD is heated to an offset temperature in step 256. The temperature calibration of the RTD is checked in step 258, and if the calibration is unsuccessful, the accumulator and alarms are reset in step 260. If the flow timer has expired in step 262, the timer is reset in step 264, and the process returns to step 254 for reestablishing the reference calibration, otherwise if the timer has not expired in step 262, the process returns to step 256 to heat the RTD.

If the temperature calibration is successful, a time delay is inserted in step 266, where the accumulator and flow are measured and recorded. If the accumulator value of step 268 is not exceeded in step 270, the process returns to step 256 for RTD heating. If the accumulator value exceeds the maximum value in step 270, and the flow value does not rise above the trip point in step 272, the process returns to step 268 where the accumulator and flow are recorded. If the flow value does exceed the trip point in step 272, the flow sensor interrupts the flow of water by sending a lock signal to an alarm device in step 274, and terminates the process in step 276.

Referring now to FIG. 5, a perspective view of the structure of the RTD flow sensor element is shown and generally designated 280. Sensor element 280 includes a threaded portion 282 with a sensor probe 284 extending perpendicularly. A pair of electrical contacts 286 is equipped with terminal screws 288 to facilitate electrical connections to the sensor elements. It is to be appreciated that the RTD device as shown are standard RTD devices, and are available from a variety of commercial sources.

Installation

A qualified plumber should install the sensor probe 227 fitting in the main water line 211. This fitting can be a solder spliced in coupling, or a new pressure regulator. The low voltage sensor probe wires may be run to the user control panel at a convenient indoor location. The control panel 108 may be bezel mounted directly to the wall, or installed in an enclosure and affixed to any surface. A small power transformer can be mounted in any desirable location to provide a low voltage supply to the device.

Maintenance

There are no user serviceable parts that require maintenance or service. The sensor probe 210 bas no moving parts to wear out. However, the probe 227 is indirect contact with the water and everything else that is in the water. Solids passing through the water at high velocities may damage the probe if struck with sufficient impact. As with all surfaces in contact with water, buildup of deposits on the probe may affect its operation with time. However, in a preferred embodiment, its stainless steel construction will greatly resist this deposit buildup.

The control panel 108 has a pair of lithium battery cells, which provide fault indication in the event of AC power loss. These batteries may require replacement after many years of operation. No special tools are required to remove or replace them and they are readily available.

Operation

The water flow monitor does not require any special operation or handling. It simply detects and displays water flow. If the water flow does not completely stop at least one time, within the programmed time window it displays and sounds the alarm. The touch switch may be pressed to silence the alarm, or held down to clear the alarm condition. The flow lamp will indicate the water flow rate to help in determining the magnitude and source of the water loss. If an alarm is sounded and the auxiliary lamp is lit, another sensor has activated the water flow monitor and it requires attention.

To power down the system, press and hold down the touch switch for five seconds. All lamps will turn off, and the flow monitoring will stop. To power up the water flow monitor, simply press the touch switch for one second.

An Alternative Preferred Embodiment

Figure 6:
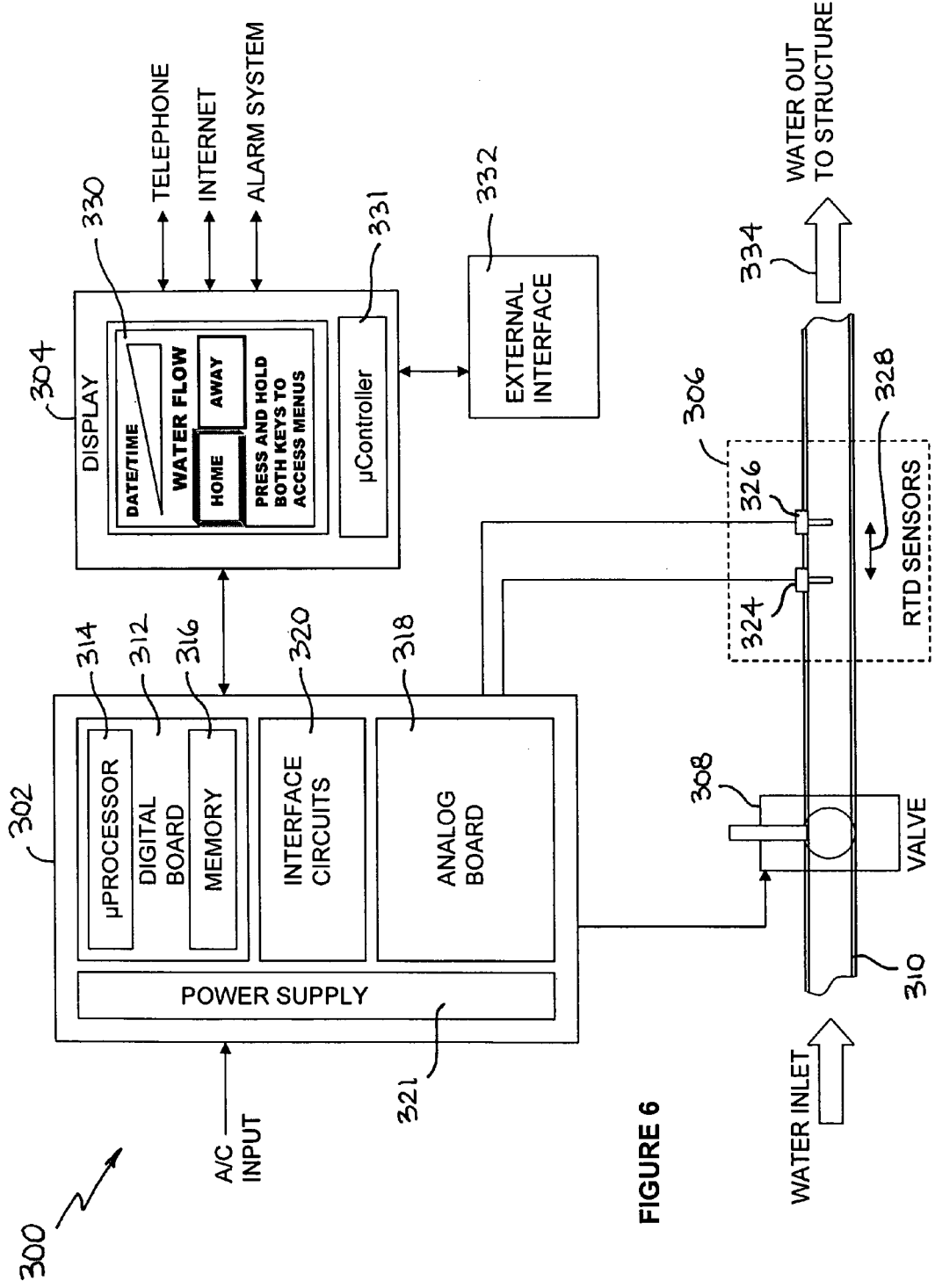
FIG. 6 is a block diagram of an alternative embodiment of the present invention showing a system including dual RTD sensors coupled to a controller having both analog and digital circuitry, and equipped with a user interface display and a valve for interrupting the flow of water through a conduit should a leak be detected.

Referring now to FIG. 6, a block diagram of an alternative embodiment of the present invention is shown and generally designated 300. System 300 includes a controller 302, a display 304, dual RTD sensors 306, and a valve 308 to interrupt the flow of fluid through a supply line 310.

Controller 302 includes digital circuitry 312 having a microprocessor 314 having a suitable memory 316 including both RAM and ROM, and an analog circuit 318. It is to be understood by those in the art that the microprocessor may be defined generally to include microcontrollers, programmable digital devices, or other digital control devices providing suitable control functions.

Display 304, in a preferred embodiment, is a touch screen LCD display unit comprising a microcontroller 331 having a serial data interface to allow communication between the display 304 and controller 302. Additionally, the microcontroller 331 may provide interfaces for telephone, internet, and alarm systems, as well as custom external interfaces 332.

Dual RTD sensor 306 includes an ambient temperature RTD 324 which is downstream in the conduit from flow sensing RTD 326, and both are electrically coupled to controller 302. The input from the RTD sensors 324 and 326 are received in the analog circuit where, as will be more fully discussed below, the flow level will be determined and that information passed on to the control panel circuitry which will begin to determine the existence of a leak.

The user interface display 304 will receive information from controller 302 and display the status of the device of the present invention in an exemplary format as shown. In the event a leak is detected, the valve 308 may be activated by control panel 304 via controller 302 to interrupt the flow of water through conduit 310 thereby avoiding significant water damage.

Figure 7:
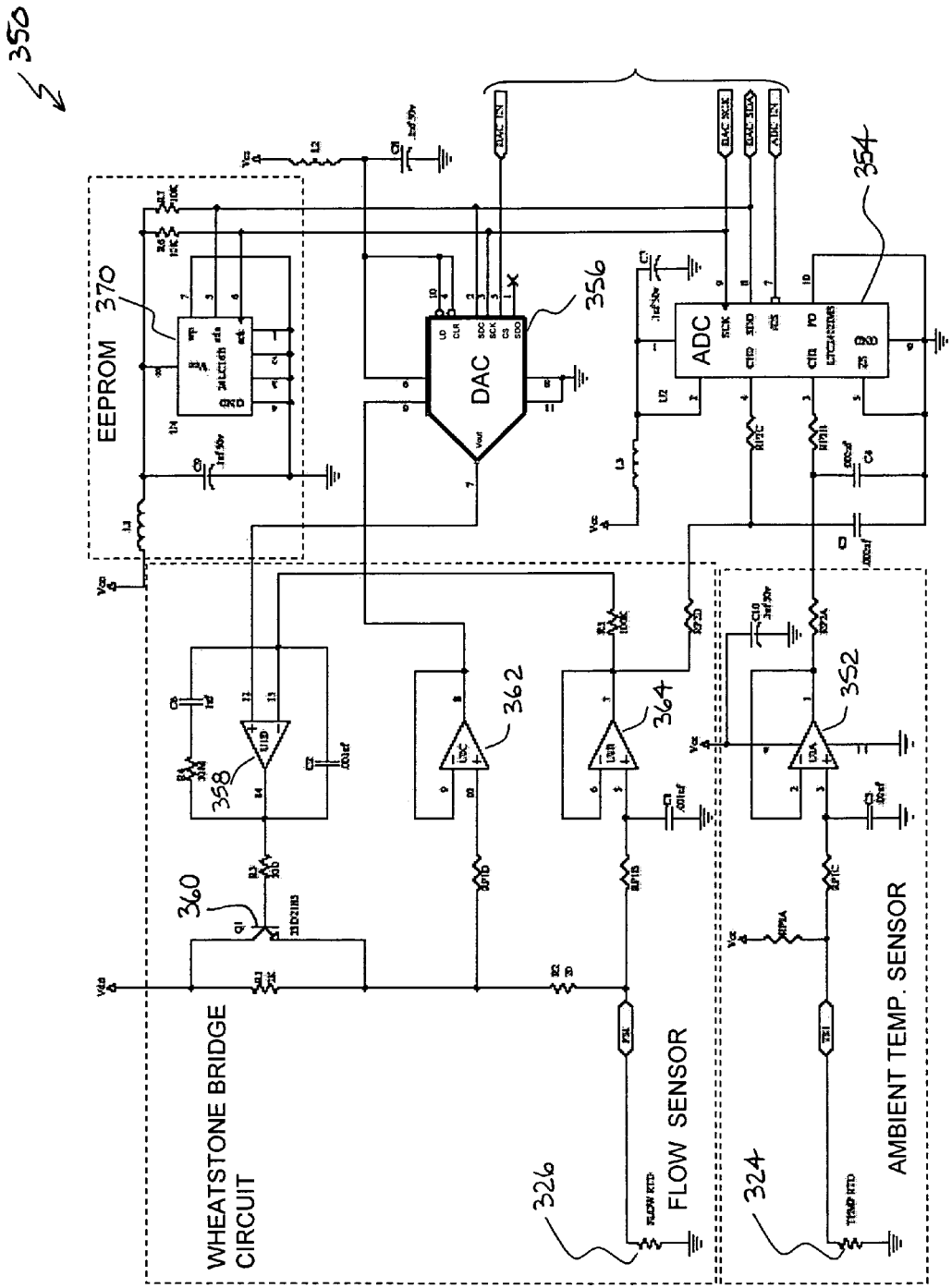
FIG. 7 is a schematic diagram of the analog portion of the controller circuitry having an ambient temperature RTD sensor configured to sense the temperature of the fluid in the conduit, and a flow RTD sensor configured in an adjustable Wheatstone bridge circuit to sense the flow of the fluid in the conduit, with the output of each sensor being sampled using an Analog to Digital converter.

Referring now to FIG. 7, a schematic diagram of the analog portion of the controller circuitry having an ambient temperature RTD sensor 324 configured to sense the temperature of the fluid in the conduit, and a flow RTD sensor 326 configured in an adjustable Wheatstone bridge circuit to sense the flow of the fluid in the conduit, with the output of each sensor being sampled using an Analog to Digital converter 354.

Fluid Flow Measurement

With reference to FIG. 7, the two RTDs 324 and 326 are, in a preferred embodiment, 100 ohm elements at zero degrees Celsius, one labeled "Temp RTD" is excited by resistor RP1C which is pulled up to a regulated power supply connection. This excitation resistor creates a small current flow through the RTD and produces a voltage drop proportional to the temperature in contact with the RTD. This voltage drop is buffered and noise filtered by amplifier U1B through RP1D and C5. The output signal is additionally filtered and conditioned by RP2A, C4 and RP2B before being input to the ADC 354 on channel 1 labeled U2.

U2 is a high resolution ADC with two channels that converts analog voltage to digital packets through a 3-wire interface labeled DAC_SCK, DAC_SDA & ADC_EN. These digital signals are processed through a microcontroller which simply resolves the data into digital readable voltages.

The RTD labeled "Flow RTD" is excited by resistor R2 and Q1 360. R1 is a small bias resistor used to ensure that there is always some current flowing through the RTD circuit even if Q1 is switched off by amplifier U1D. This allows amplifiers U1A & U1C to always have some voltage to read both into U2 channel 0 and the reference input of DAC 356 (U3).

U1A amplifier reads the voltage drop across the Flow RTD through a noise filter RP1A and C1. The buffered output of U1A is directed through additional filtering RP2D, C3, and RP2C and into channel 0 input of U2. The previously described U2 now can also present the microcontroller with temperature and flow RTD voltages. U1A also directs its output through feedback resistor R5 which is connected to the invert terminal of amplifier U1D. This allows U1D output to servo the voltage and current flow presented to the Flow RTD through R3, Q1 & R2. Components R4, C6 & C2 form a frequency compensation and integration network to keep U1D invert input in phase with its non-invert input. The non-invert signal is supplied by DAC 356 (U3).

DAC 356 (U3) converts microcontroller digital packets through a 3-wire interface labeled DAC_SCK, DAC_SDA & DAC_EN into an analog voltage which establishes a reference for U1D to follow. DAC U3 has a reference input voltage (U3 pin 6) which is buffered by amplifier U1C & RP1B. This reference signal allows the DAC to track the changing Flow RTD voltage with respect to ground (U3 pin 11) and create a ratio-metric measurement between the Flow RTD circuit and the DAC circuit.

The ratio-metric configuration is similar to a Wheatstone bridge circuit; however in the present invention the reference side of the Wheatstone bridge has been replaced with a DAC 356 that can simulate the resistance needed to balance a Wheatstone bridge under microprocessor control. A microcontroller 402 (shown in FIG. 8) reads the temperature voltage and determines what value resistance that voltage equates to using Ohms Law. By knowing the value of RP1C and Vcc, current can be calculated. Resistance of the Temp RTD 324 is a result of dividing the ADC temperature voltage by the previously calculated current. This resistance established the bottom element of the reference side of the Wheatstone bridge. The top element of the reference side of the Wheatstone bridge is simply the known resistance of the RTD Flow load resistor R2. The ratio between these two resistors is calculated by the microprocessor 402 and fed through the DAC_SCK, DAC_SDA & DAC_EN pins.

To create flow measurement, the Flow RTD 326 must be heated somewhat to allow the servo-ing amplifier to compensate for cooling effects of flow in direct proportion to the power it takes to restore the Wheatstone bridge to a balanced condition. This effect is based on King's Law which relates flow measurement proportional to power. The amount of heat required to measure flow also affects the devices sensitivity to flow. Greater heating of the Flow RTD will result in greater sensitivity to flow as described in King's Law. The microprocessor 402 which controls the DAC 356 can effectively alter the ratio-metric balance between the two sides of the Wheatstone bridge, and through external calibration, the sensitivity or heating of the Flow RTD 326 is empirically determined in flow, and the ratio-metric balance is saved in microprocessor memory.

The ratio-metric bridge balance is adjusted by simply adding "virtual" resistance to the calculated Temp RTD resistance value. This effect causes the bridge to balance by elevating the Flow RTD voltage drop by increasing the power into the RTD thus heating it up to a point where the ratio-metric balance is restored. Water flow across the Flow RTD 326 will cause it to cool down, where U1D will detect this cooling and apply compensation current to the RTD through Q1 360 to re-establish a balance condition. If too much heat is read by U1D, it will switch off Q1 326 to allow the water to cool the Flow RTD 326 without any excitation current.

EEPROM 370 (U4) is a memory storage device to retain the empirically determined calibration data during setup calibration. Each RTD 324 and 326 has its own unique characteristics as does the electronics that the RTD is connected. The EEPROM carries this calibration data perpetually and feeds the microprocessor 402 with the stored information through its two wire interface SDA & SCK.

The unique attributes of this invention are that the temperature RTD 324 is completely decoupled from the varying current effects of the typical Wheatstone bridge, while its resistance information is conveyed through a DAC 356. This allows this invention to adjust all the temperature control aspects of the bridge through software changes and algorithmic adjustments, and not by trimmer or shunt resistors. The system can also correct via software for temperature variances across the entire operating range of flow measurement and perform linearized flow output readings proportional to flow and temperature.

In the present invention, the excitation temperature point of the flow RTD can be determined by the level of sensitivity deemed necessary and is application specific. Measuring a minute flow in a small tube is going to require a different excitation than sensing for a gross flow in a large pipe. Thus, depending on the application, the excitation temperature of the flow RTD 326 may be selected to achieve the desired sensitivity and flow detection results. The excitation determination may be made through empirical measurements stored in memory, through use of a look-up table based on ambient temperature readings, or any other method knows in the industry.

Figure 8:
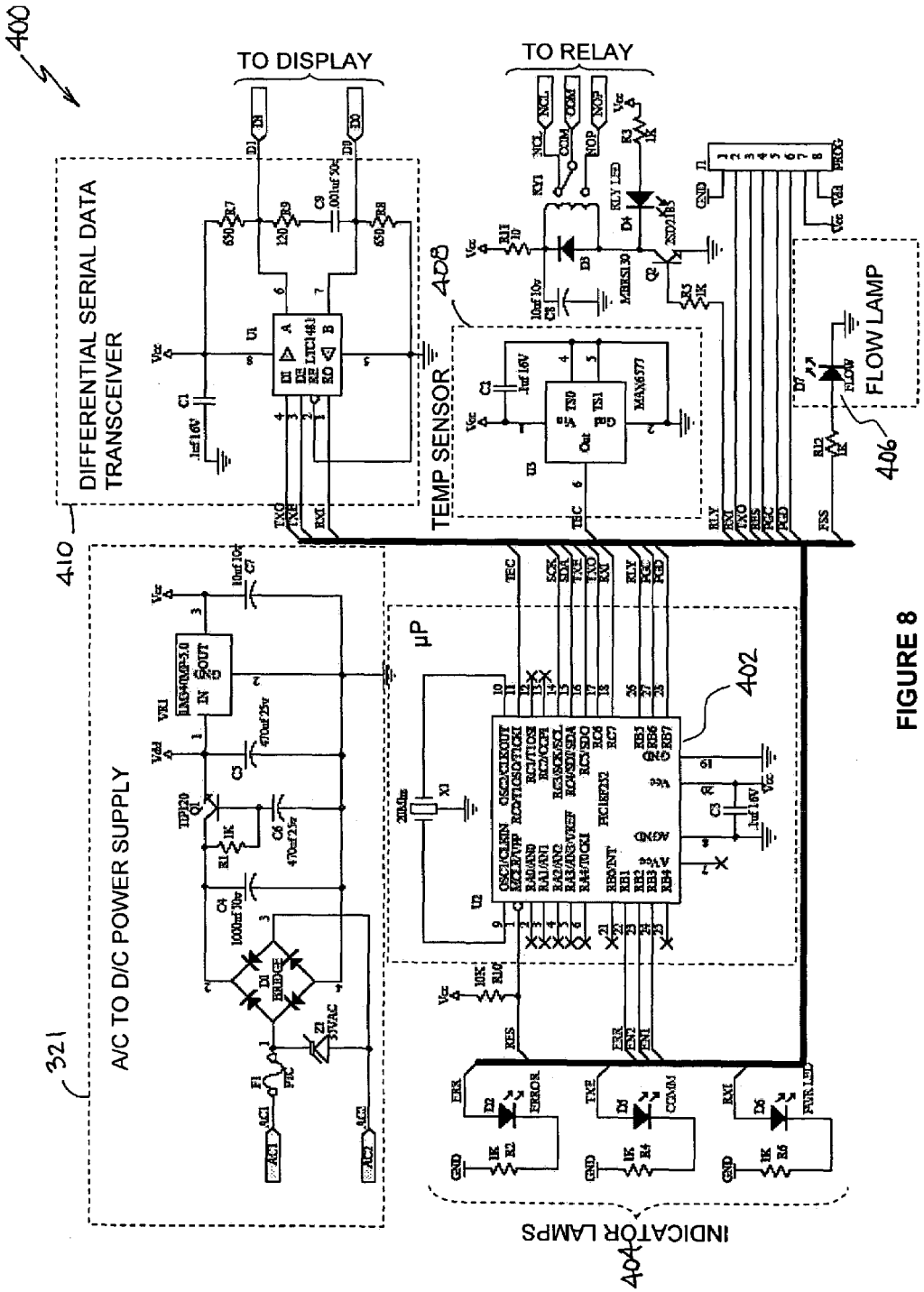
FIG. 8 is a schematic diagram of the digital portion of the controller circuitry having a microprocessor equipped with a differential serial data transceiver to communicate with the user display, and an on-board temperature sensor to monitor the temperature of the circuitry for temperature fluctuations which might give rise to component performance variations, and also includes a series of indicator lamps for providing status indicators for the system.

Referring now to FIG. 8, a schematic diagram of the digital portion of the controller 302 circuitry is shown and generally designated 400. Schematic 400 includes a microprocessor 402 equipped with a differential serial data transceiver 410 to communicate with the user display 304 (shown in FIG. 6).

An on-board temperature sensor 408 monitors the temperature of the circuitry for temperature fluctuations which might give rise to component performance variations. The output of temperature sensor 408 is received by microprocessor 402 and may be utilized to compensate for the effects of local air temperature on the components of the analog board with regards to the flow measurement. If flow/temp effects are determined empirically then a compensation map will be written to the microprocessor 402 to maintain flow level accuracy.

A series of indicator lamps 404 are included to provide a visual status indicator for the system of the present invention. A flow lamp 406 may also be provided which would give an immediate visual indicator when a fluid is flowing through the conduit. A power supply 321 is shown and includes a full-wave rectifier for transforming the AC input voltage to a stable DC voltage for use by the present invention. It is to be appreciated that the power supply 321 could be supplement with, or replaced by, a battery source.

Figure 9A:
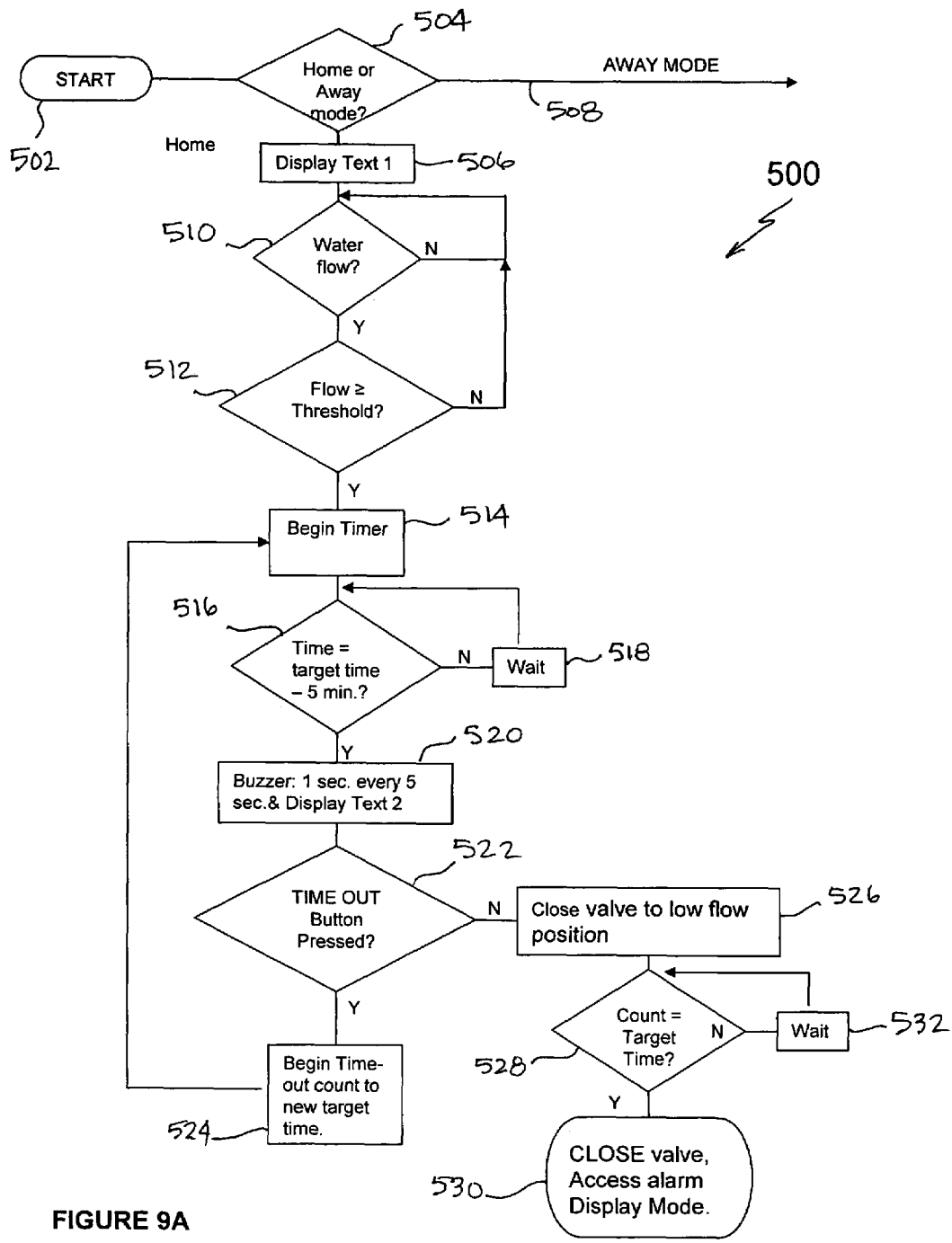
FIG. 9A is a flow diagram of an exemplary operation of the system of the present invention, and includes a process for operation of the system while in the HOME mode.
Figure 9B:
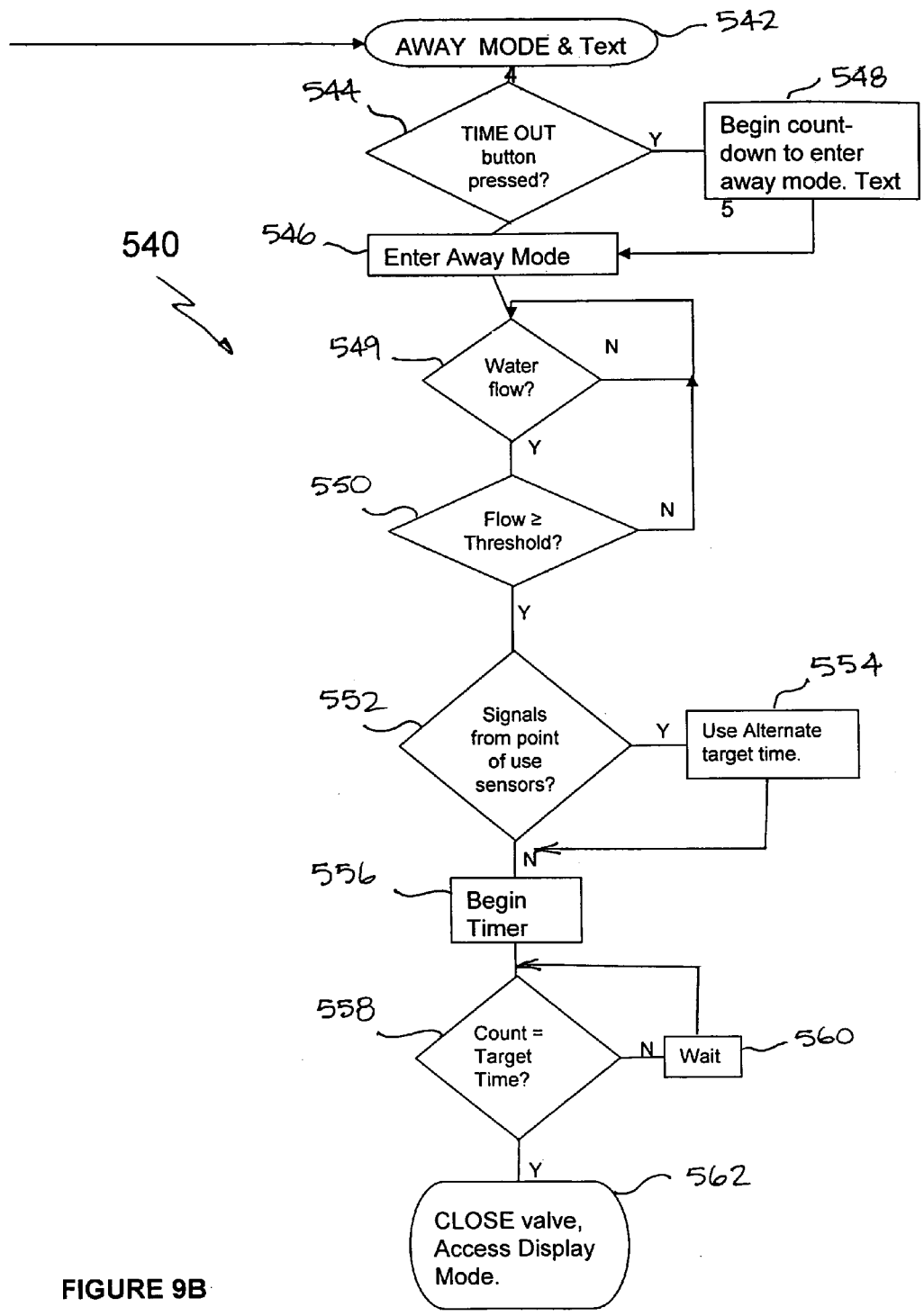
FIG. 9B is a flow diagram of an exemplary operation of the system of the present invention, and includes a process for operation of the system while in the AWAY mode.
Figure 9C:
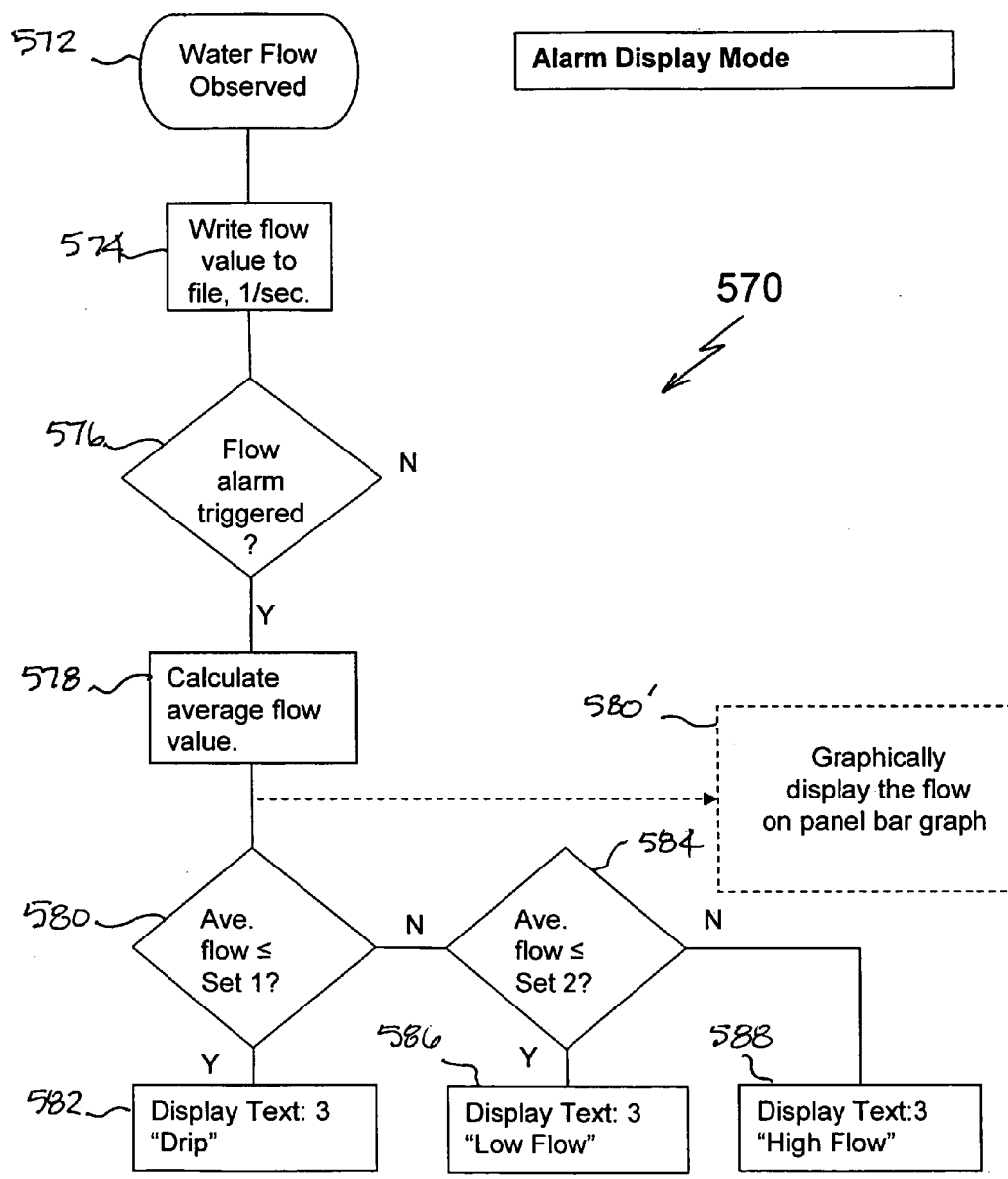
FIG. 9C is a flow diagram of an exemplary operation of the system of the present invention, and includes a process for operation of the system while in the ALARM DISPLAY mode.
Figure 10:
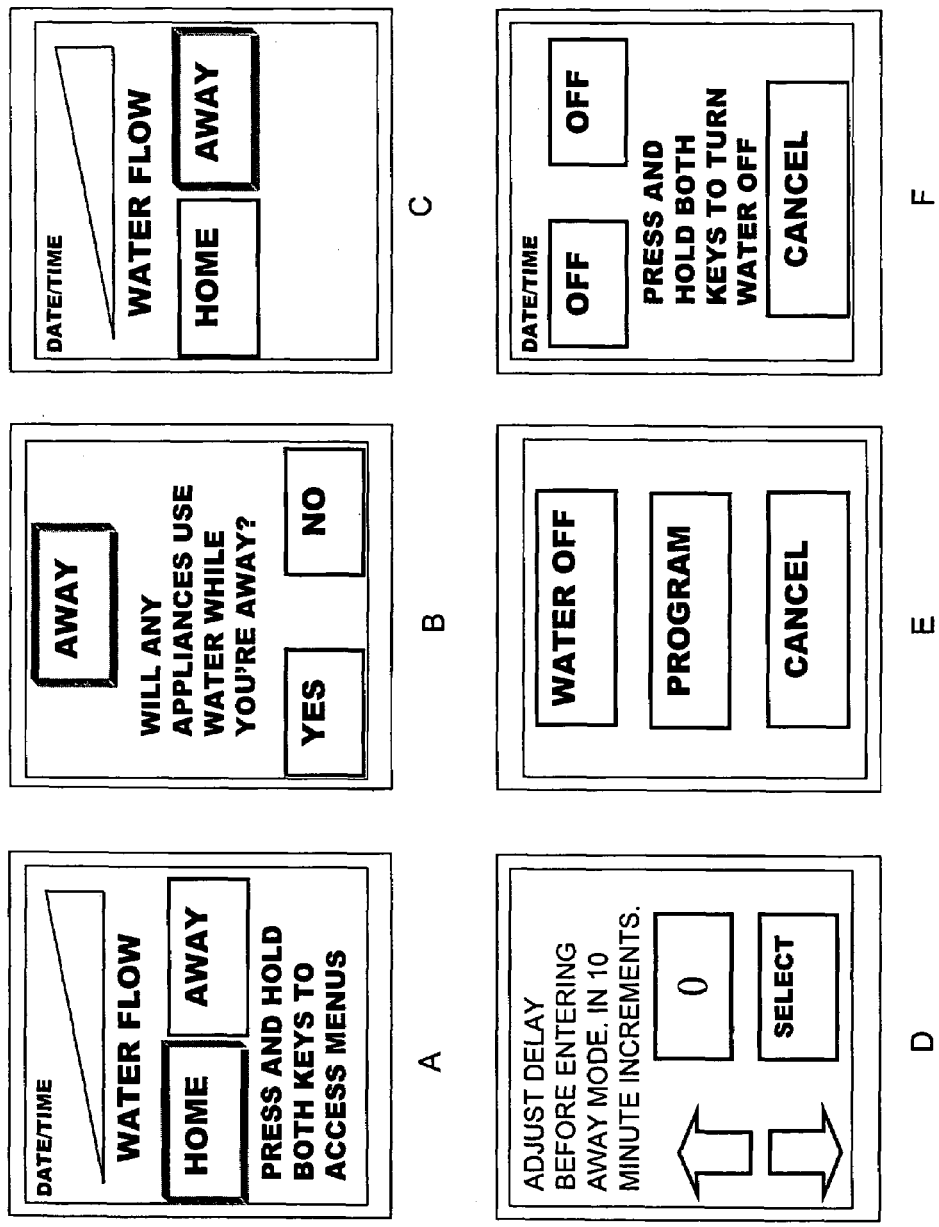
FIGS. 10A through 10FF depict exemplary display conditions presented on the user interface display through various operational conditions for the system of the present invention, including the HOME mode, the AWAY mode, and the adjustment of the flow sensor settings.
Figure 10:
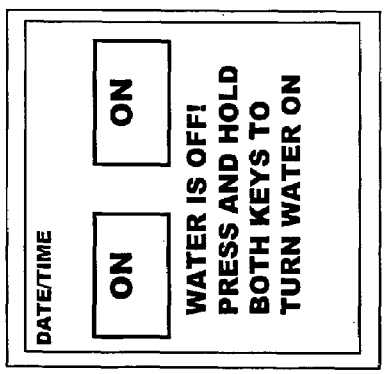
Figure 10:
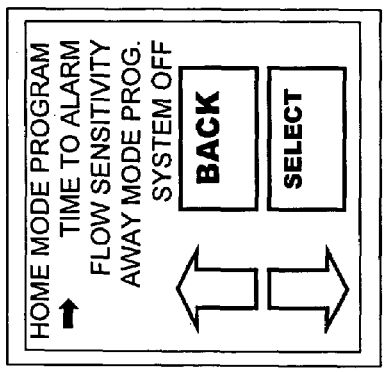
Figure 10:
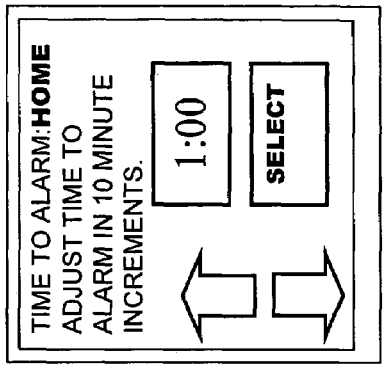
Figure 10:
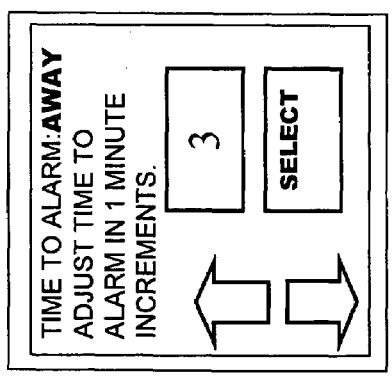
Figure 10:
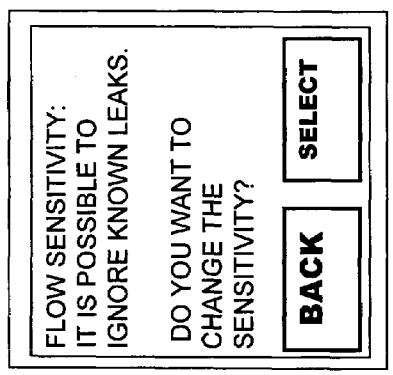
Figure 10:
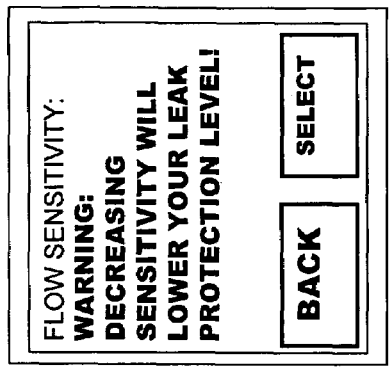
Figure 10:
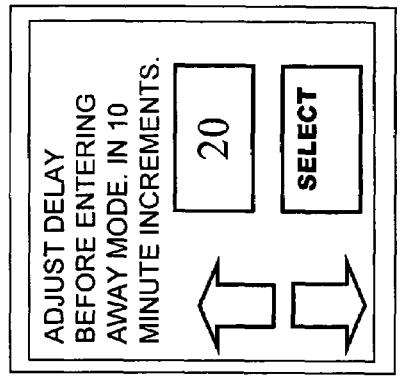
Figure 10:
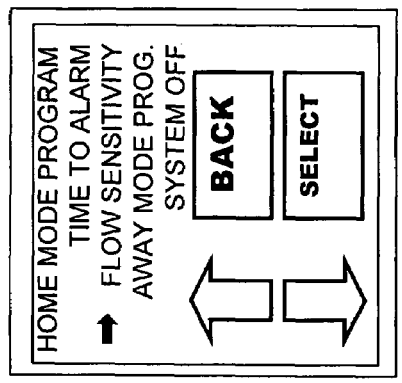
Figure 10:
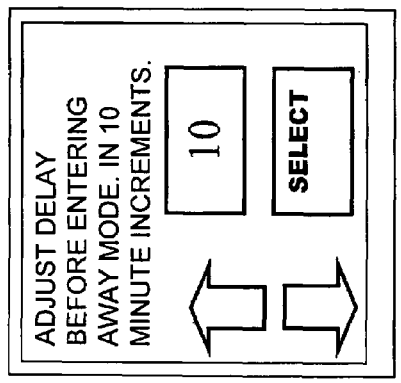
Figure 10:
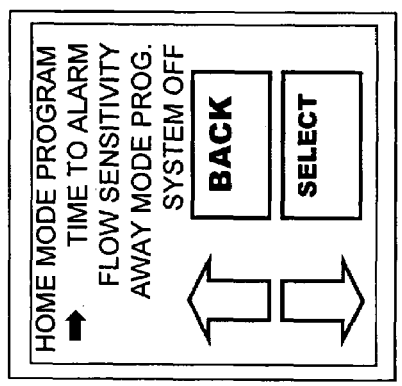
Figure 10:
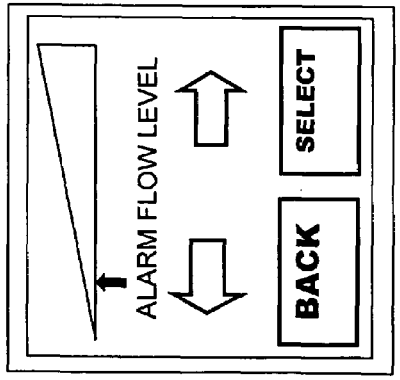
Figure 10:
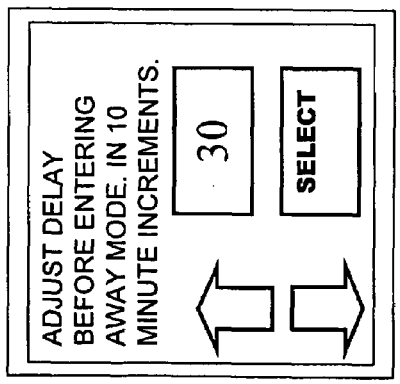
Figure 10:
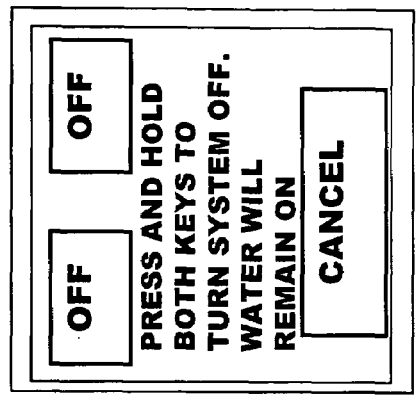
Figure 10:
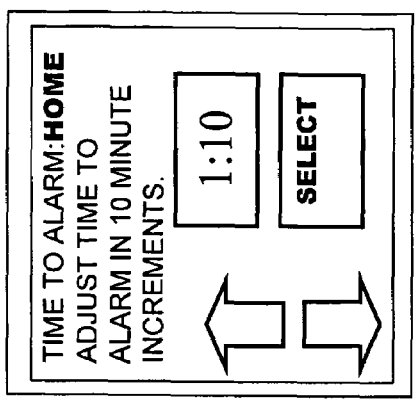
Figure 10:
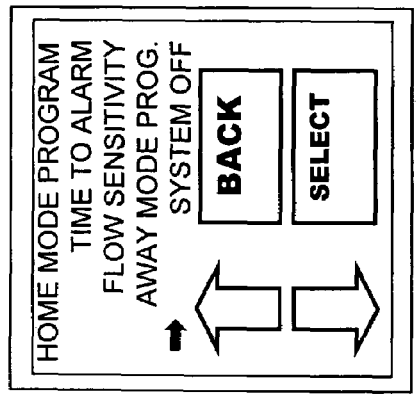
Figure 10:
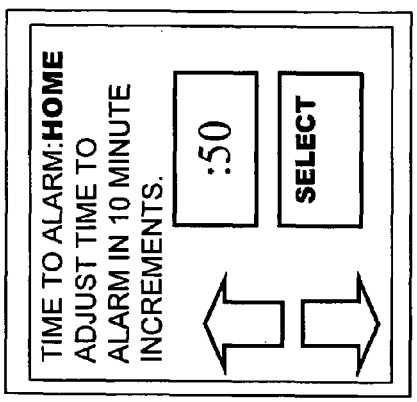
Figure 10:
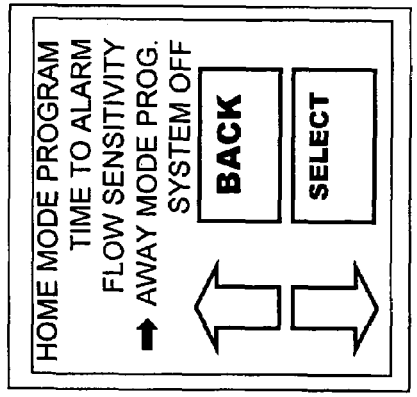
Figure 10:
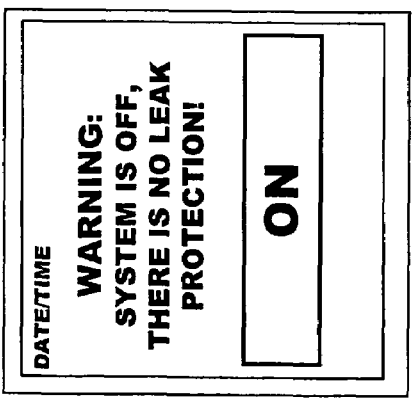
Figure 10:
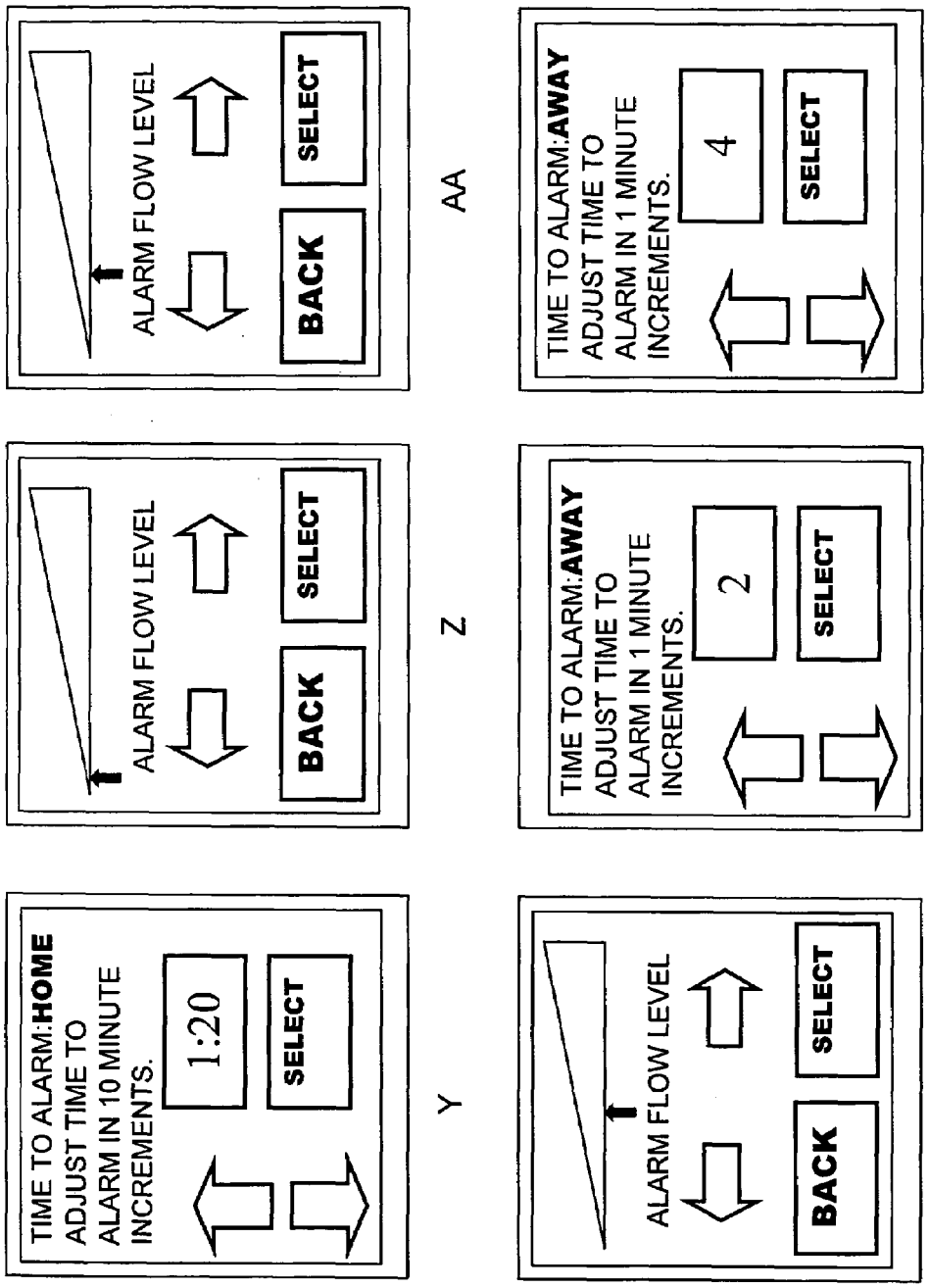
Figure 10:
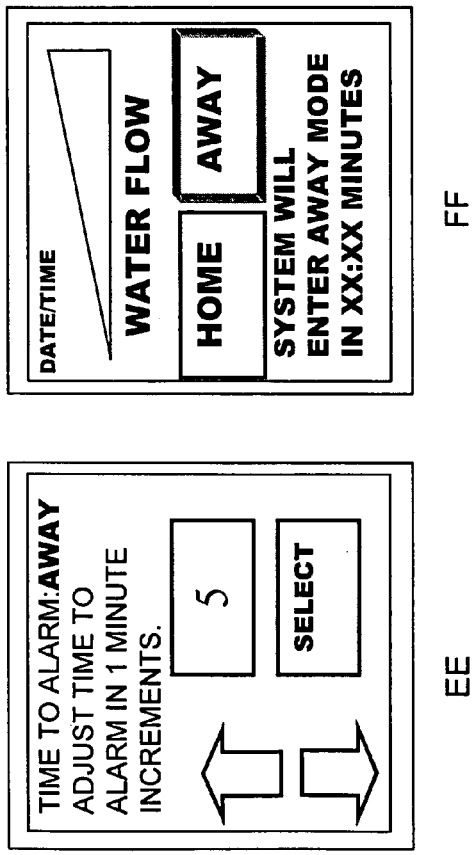

FIGS. 9A, 9B, and 9C provide an exemplary operation of the system of the present invention. Specifically, FIG. 9A outlines a process, generally designated 500, for operation of the system while in the HOME mode.

Process 500 begins in step 502 and determines in step 504 whether the system is in the HOME mode or the AWAY mode. In the home mode, the display shows a HOME MODE indicator in step 506. Once in home mode, the flow of water is determined in step 510, until the detection of flow advances control to step 512. If the flow is below a predetermined threshold in step 512, the flow is continuously monitored in steps 510 and 512. However, if the flow is above the predetermined threshold in step 512, a flow timer is initiated in step 514.

When the flow timer exceeds a preset time as determined in step 516, a warning device, such as buzzer, is sounded in step 520, and a warning timer is initiated in step 522. If a TIME OUT button is pressed by the user, a new target time is set in step 524, and the process return to step 514 to continue monitoring flow. In the event that the warning timer timed out and the TIME OUT button was not pressed, the supply valve is partially closed to a low flow position in step 526. If the count down timer expires in step 528, the supply valve is completely closed, and the display shows an alarm condition for the user to receive upon return.

Referring now to FIG. 9B, a flow diagram of an exemplary operation of the system of the present invention while in the AWAY mode is shown and generally designated 540. Process 540 begins by displaying the AWAY mode in step 542, and if a TIME OUT button is pressed in step 544, the count-down timer is started in stem 548. Otherwise, the system enters the AWAY mode immediately, and begins to sense any water flow in step 549. If any water flow is detected, it is compared to a flow threshold in step 550. If the flow threshold is not met, the system continues to monitor flow in steps 549 and 550.

In the event that the flow exceeds the flow threshold in step 550, the system checks for signals from point of use detectors, such as those attached to water softeners and filters in step 552. If no other sensor input is sensed in step 552, the process initiates a timer in step 556, and the timer counts down through step 558 to close the water supply valve in step 562. In the event that signals are received from point leak detectors, an alternate target time is set in step 554, and the process repeats steps 556, 558, and 562.

FIG. 9C shows a flow diagram generally designated 570 of an exemplary operation of the system of the present invention, and includes a process for operation of the system while in the ALARM DISPLAY mode. When water is observed in step 572 a flow value is determined, and the flow value is recorded in step 574, if a flow alarm is triggered in step 576. The flow value is then analyzed in step 578 to determine an average flow value; this average flow value is displayed on the horizontal bar graph as the average flow that occurred during the time window leading up to the alarm, thus advising the user of the relative extent of the leak which caused the alarm. The flow value is then analyzed in step 578 to determine an average flow value, and if the average flow value is above a first preset limit as determined in step 580, a DRIP indicator is shown in step 582. If the average flow value is above a second preset limit as determined in step 584, a LOW FLOW indicator is shown in step 586. If the average flow value is also above a third preset limit, a HIGH FLOW indicator is shown.

As an alternative to step 580, step 580' can be implemented to graphically display the flow rate on the user interface panel bar graph. This would allow the user to quickly ascertain the extent of the fluid lead.

Referring now to the display 304 in FIG. 6, in combination with FIGS. 10A through 10FF, a representation of exemplary display conditions is presented. It is to be appreciated that these display conditions are merely exemplary of present user interface displays on the user interface, and incorporates display conditions related to the setup and programming of the device of the present invention. More specifically, FIG. 10 and its various views display operational conditions for the system of the present invention, including the HOME mode, the AWAY mode, and the adjustment of the flow sensor settings.

While the Thermal Dispersion Flow Meter With Chronometric Monitor for Fluid Leak Detection of the present invention as herein shown and disclosed in detail is fully capable of obtaining the objects and providing the advantages herein before stated, it is to be understood that it is merely illustrative of preferred embodiments of the invention and that no limitations are intended to the details of construction or design herein shown other than as described in the appended claims.

The invention claimed is:

1. A fluid leak detector for detecting leakage in a presurized fluid system having a closed fluid conduit, the fluid leak detector comprising:

a first sensor disposed within said conduit and capable of sensing the ambient temperature of the fluid within said conduit;

a second sensor disposed within said conduit and responsive to a drive signal to elevate the temperature of said second sensor;

a means for generating said drive signal in communication with said second sensor to drive said second sensor to a temperature above the ambient temperature; and a means for detecting the flow of fluid through said conduit.

2. The fluid leak detector of claim 1, wherein said means for detecting the flow of fluid through said conduit further comprises a means for sensing current flow through said second sensor.

3. The fluid leak detector of claim 1, wherein said means for generating a drive signal for said second sensor further comprises an adjustable wheatstone bridge circuit wherein said second sensor represents an element in the bridge circuit responsive to said flow of fluid through said conduit.

4. The fluid leak detector of claim 3, further comprising an analog to digital converter in communication with said second sensor and said means for detecting the flow of fluid through said conduit, said analog to digital converter configured to sense said elevated temperature and generate a corresponding digital signal to said means for detecting.

5. The fluid leak detector of claim 4, further comprising a means for comparing said digital signal corresponding to said elevated temperature to a predetermined value.

6. The fluid leak detector of claim 5, further comprising an analog to digital converter in communication with said first sensor and said means for detecting the flow of fluid through said conduit, said analog to digital converter configured to sense said ambient temperature and generate a corresponding digital signal to said means for detecting.

7. The fluid leak detector of claim 4, further comprising a means for comparing said digital signal corresponding to said ambient temperature to a predetermined value.

8. The fluid leak detector of claim 1 wherein said first RTD sensor is upstream in said fluid conduit from said second RTD sensor.

9. The fluid leak detector of claim 1, further comprising a shutoff valve in communication with said means for detecting fluid flow through said conduit, and responsive to a signal from said means for detecting to interrupt said fluid flow through said conduit.

10. the fluid leak detector of claim 1, further comprising a display in communication with said means for detecting, configured to display a status indicator of said fluid leak detector.

11. A device for interrupting the flow of fluid through a fluid conduit upon the detection of a leak, comprising:

an ambient temperature RTD sensor disposed in said fluid conduit;

a flow-sensing RTD sensor disposed in said fluid conduit;

a controller in electrical communication with said ambient temperature RTD sensor and said flow-sensing RTD sensor, said controller sensing an ambient temperature signal from said ambient temperature RTD sensor, and generating a driving signal to drive said second RTD sensor to a temperature greater than said ambient temperature;

a means for comparing the ambient temperature signal and the drive signal to a predetermined value and generating a shutoff signal in response thereto; and a valve in communication with said controller to receive a shutoff signal from said controller to close said valve in response thereto.

12. The device of claim 11, wherein said controller further comprises:
a microprocessor;
a memory in communication with said microprocessor; and
an analog interface in communication with said microprocessor and capable of generating said driving signal.

13. The device of claim 12, wherein said memory further comprises a look-up table having ambient temperature data and corresponding drive signal level data for driving said second RTD sensor to a temperature greater than said ambient temperature.

14. The device of claim 11, further comprising:
a display in communication with said controller, said display configured to display a status indicator.

15. The device of claim 14, wherein said status indicator further comprises a HOME status indicator and an AWAY status indicator.

16. The device of claim 14, wherein said status indicator further comprises a LEAK status indicator.

17. The device of claim 14, wherein said status indicator further comprises a FLOW RATE indicator corresponding to a flow rate signal from said flow sensing RTD.

18. The device of claim 11, further comprising an external temperature sensor in communication with said controller and configured to generate a signal corresponding to said external temperature.

19. The device of claim 11, further comprising a program memory.

20. The device of claim 19, wherein said program memory further comprises an EEPROM in communication with said controller and configured to provide program instructions and look-up table data to said controller.

21. A method for detecting the flow of fluid through a conduit using an RTD disposed within said conduit, said method comprising:
sensing a reference temperate of said fluid in said conduit using said RTD;
heating said RTD to an offset temperature;
calibrating said RTD at said offset temperature;
determining the flow of said fluid through said conduit;
comparing said flow of said fluid to a pre-determined flow value; and
providing a signal if said flow of said fluid exceeds said pre-determined flow value.

22. The method of claim 21, wherein said offset temperature is greater than said reference temperature.

23. The method of claim 21, wherein said offset temperature is greater than said reference temperature by a pre-established temperature gap.

24. The method of claim 21, further comprising:
determining whether said calibrating of said RTD at said offset temperature was successful.

25. The method of claim 24, further comprising:
repeating said step of heating said RTD to an offset temperature if said calibration was unsuccessful.

26. The method of claim 21, wherein the step of determining the flow of said fluid through said conduit further comprises:
waiting a pre-determined delay period;
Incrementing a time accumulator; and
verifying said time accumulator has reached a maximum value.

27. A method for detecting the flow of fluid through a conduit using a first RTD and a second RTD, each said RTD disposed within said conduit, said method comprising:
sensing a reference temperate of said fluid in said conduit using a first RTD;
heating a second RTD to an offset temperature;
determining the flow of said fluid through said conduit;
comparing said flow of said fluid to a pre-determined flow value; and
providing a leak signal if said flow of said fluid exceeds said pre-determined flow value.

28. The method of claim 27, further comprising:
sensing a mode setting; and
determining said pre-determined flow value corresponding to said mode setting.

29. The method of claim 28, wherein said MODE setting is selected from a HOME mode and an AWAY mode.

30. The method of claim 29, further comprising:
receiving said leak signal; and
closing a valve terminating the flow of said fluid through said fluid conduit.

* * * * *